L. HORNOR.
BACK STOP BRAKE FOR AUTOMOBILES.
APPLICATION FILED JUNE 1, 1916.
1,203,876.
Patented Nov. 7, 1916.
2 SHEETS—SHEET 1.
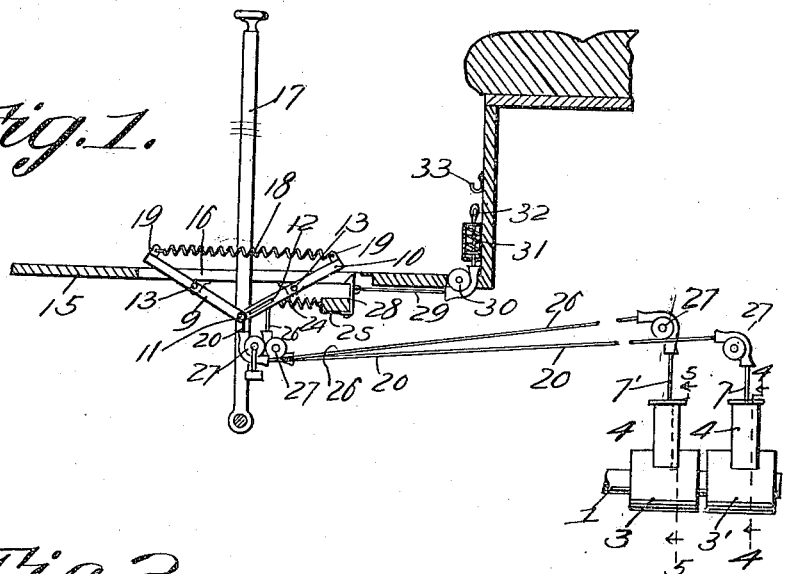
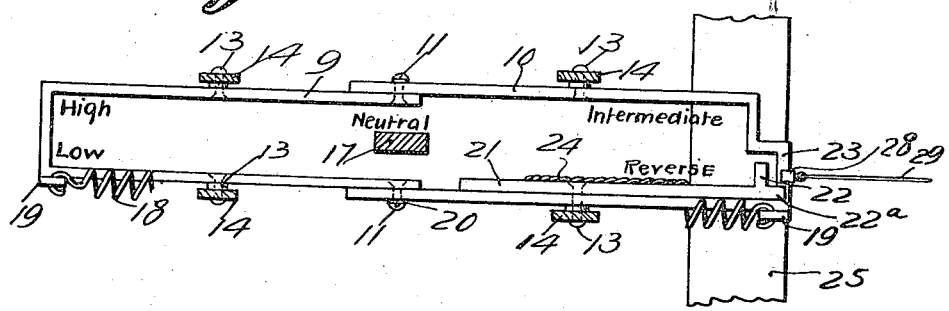
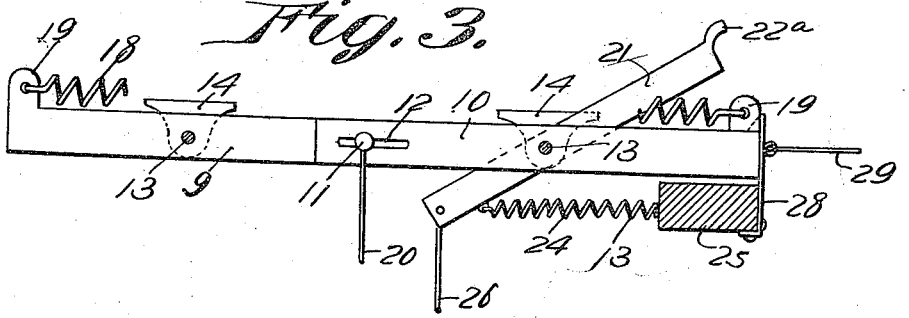
Witnesses
Levi Hornor,
Inventor
by
Attorneys L. HORNOR.
BACK STOP BRAKE FOR AUTOMOBILES.
APPLICATION FILED JUNE 1, 1916.
1,203,876.
Patented Nov. 7, 1916.
2 SHEETS—SHEET 2.
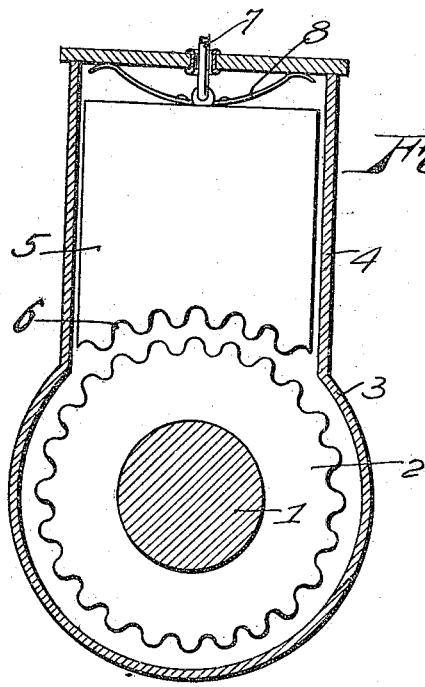
*Fig. 4.*
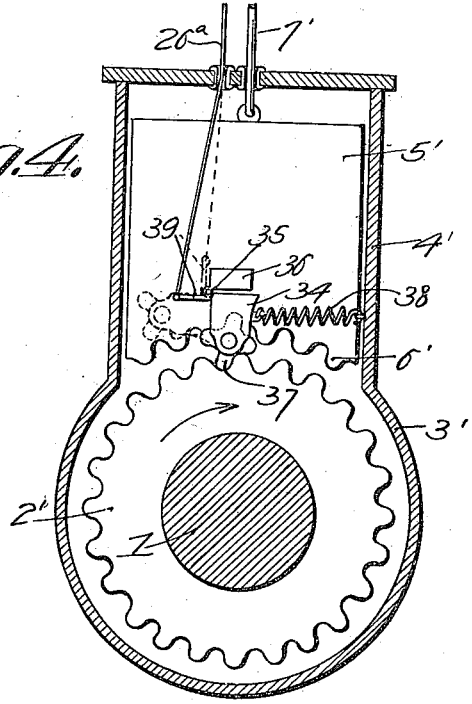
*Fig. 5.*
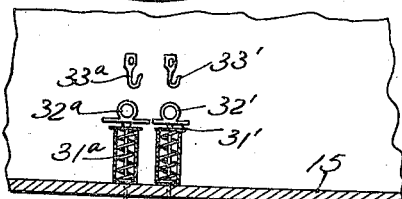
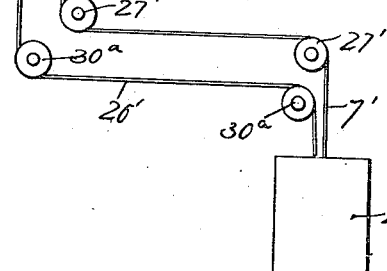
*Fig. 6.*
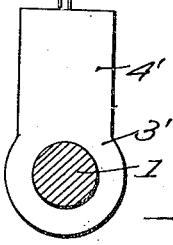
Witnesses
Levi Hornor,
Inventor
by
Attorneys

UNITED STATES PATENT OFFICE.

LEVI HORNOR, OF WICHITA, KANSAS.

BACK-STOP BRAKE FOR AUTOMOBILES.

1,203,876.  Specification of Letters Patent.  Patented Nov. 7, 1916.

Application filed June 1, 1916. Serial No. 101,118.

*To all whom it may concern:*

Be it known that I, LEVI HORNOR, a citizen of the United States, residing at Wichita, in the county of Sedgwick and State of Kansas, have invented a new and useful Back-Stop Brake for Automobiles, of which the following is a specification.

The present invention is a back stop brake for automobiles, and it is the object of the invention to provide a brake mechanism operable to automatically stop the backward motion of the automobile should the engine become stalled or the control of the automobile lost when ascending a hill, the invention also including means for stopping the car when descending a hill.

It is also the object of the invention to provide a mechanism of the nature indicated which is comparatively simple and inexpensive in construction, which can be readily installed in various automobiles, and which will serve its office in a practical and efficacious manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a side elevation of the mechanism, somewhat diagrammatical in nature, with portions broken away. Fig. 2 is a plan view of the device controlled by the gear shift lever, this lever being on an enlarged scale. Fig. 3 is a side elevation of the device illustrated in Fig. 2. Figs. 4 and 5 are enlarged sectional views, taken on the lines 4—4 and 5—5, respectively of Fig. 1. Fig. 6 is a view illustrating a modification.

The mechanism is associated with a rotatable shaft or member 1 of the automobile, which may be the rear axle shaft or any other rotatable part of the machine, which when held stationary, prevents the movement of the car. In carrying out the invention, toothed collars or wheels 2 and 2' are made fast upon the shaft 1 in any suitable manner, and as illustrated are inclosed in separate casings 3 and 3', respectively, which surround the shaft 1, although a common casing for said collars can be used if preferred. The casings 3 and 3' have the respective upstanding pockets 4 and 4' in which the respective dogs 5 and 5' are slidable to and from the collars. Those ends of the dogs adjacent the collars are provided with teeth 6 and 6', respectively, adapted to interengage with the teeth of the collars whereby to prevent the rotation of the shaft 1. Attached to those ends of the dogs remote from the teeth are the cords or flexible elements 7 and 7', respectively, passing through the ends of the respective pockets. The dogs in being disposed above the collars are adapted to gravitate into engagement therewith, but can be assisted by spring tension, such as a bowed spring 8 attached to the dog 5 and bearing against the end of the pocket 4.

The device for controlling the dogs 5 and 5' embodies a pair of oppositely disposed U-shaped levers 9 and 10, one being provided adjacent its terminals with rivets or pins 11 working in slots 12 provided in the terminals of the other, whereby the adjacent arms of the levers are operatively connected to cause the levers to swing simultaneously. The levers are fulcrumed between their ends, as at 13, to bearings 14 secured to the floor 15 of the automobile or to any other suitable support, said floor or support 15 being provided with an opening 16 accommodating the levers. The levers 9 and 10 surround the gear shift lever 17, the various positions of which are designated in Fig. 2. The joints of the levers are at the opposite sides of the "neutral" position of the gear shift lever 17, while the bends of the levers 9 and 10 are located at the "high" and "low," and "intermediate" and "reverse" positions of the gear shift lever, so that when the lever 17 is moved from "neutral" position to either of its other positions, it will be moved toward and against the bend or outer arm of one of the levers 9—10. The levers 9—10 normally diverge upwardly, as seen in Fig. 1, under the influence of a coiled wire retractile spring 18 terminally attached to ears 19 with which the remote arms or bends of the levers 9—10 are provided. The levers 9—10 are so arranged, that when the gear shift lever 17 is moved to "low," "intermediate" or "high" position, the gear shift lever will contact with the bend of one of the levers 9—10 and swing the remote arms of said levers downwardly, it being noted that the levers swing simultaneously. A cord or other flexible element 20 is attached to one of the pins 11 and is attached to the cord 7 to operatively connect the levers 9—10 and dog 5. An auxiliary lever 21 is supported by one of the pivots 13 of the lever 10, and is disposed upon the inner side of the limb of said lever. The lever 21 is fulcrumed or pivoted between its ends, and the outer arm thereof is provided with a portion 22 accommodated by an offset 23 with which the bend or outer arm of the lever 10 is provided. The portion 22 has a lug 22$^a$ to seat upon the offset portion 23 when the outer arm of the lever 21 is swung downwardly. The portion 22 is arranged for the engagement of the gear shift lever 17 when it is moved to "reverse" position. The lever 21 is spring pressed to assume a position somewhat the same as the lever 10, and for this purpose, a coiled wire retractile spring 24 is connected to the inner arm of the lever 21, and to a suitable support 25, such as a bar. A cord or other flexible element 26 is attached at one end to the inner arm of the lever 21 and its other end is connected to the cord 7' to operatively connect the lever 21 and dog 5'. The cord 26 as well as the cord 20 are passed over pulleys or guides 27 having tubular guiding members for the cords.

A spring catch 28 is attached to the support 25 to snap into engagement with the portion 23 when the levers 9—10 are swung into a horizontal position, or when the remote arms of the levers are swung downwardly. This catch 28 can be released by means of a cord or other flexible element 29 attached thereto, and passed around one or more pulleys or guides 30. The cord 29 is attached to a spring pressed stem 31 having an eye or other portion 32 engageable with a hook or equivalent element 33 supported by the front board of the operator's seat, the dash board, or other suitable part of the automobile. When the eye 32 is disengaged from the hook 33, the stem 31 is moved downwardly by spring tension, thus slackening the cord 29, and permitting the catch 28 to snap into engagement with the lever 10, but when the stem 31 is raised and its eye 32 engaged with the hook 33, the catch 28 is pulled out of operative position.

The dog 5' is equipped with means for holding it out of engagement with the collar 2' during the forward rotation of the shaft 1 and collar 2', this direction of rotation of said parts being indicated by the arrow in Fig. 5. Thus, a swinging bearing or member 34 is hinged, as at 35, to a lug 36 of the dog 5', and a pinion 37 is journaled to the bearing 34 and is adapted to mesh with the teeth of the collar 2'. A coiled wire retractile spring 38 connects the bearing 34 and one wall of the pocket 4', and tends to swing the bearing 34 into a position to bring the pinion 37 into mesh with the collar 2', as seen in full lines in Fig. 5. The bearing 34, however, can swing away from the collar 2' against the action of the spring 38, as seen in dotted lines in said figure.

In order that the dog 5' can be released positively, the bearing 34 is provided with an outstanding arm 39 to which a cord or flexible element 26$^a$ is attached, said cord being passed slidably through the end of the pocket 4', whereby when said cord is pulled, it will swing the bearing from the collar 2', which will enable the dog 5' to move into engagement with said collar. When the pinion 37 engages the collar 2', the pinion 37 and bearing 34 provide a prop to hold the dog 5' away from the collar 2'.

In operation, supposing that the lever 10 is released, so that the levers 9—10 swing to the position illustrated in Fig. 1, the cord 20 will be slackened, thus slackening the cord 7 to enable the dog 5 to engage the collar 2 which will prevent the shaft 1 from rotating. Now, when the gear shift lever 17 is moved to "reverse" position, it engages the portion 22 of the lever 21, and swings the outer arm of said lever downwardly, whereby the inner arm of said lever is moved upwardly to pull the cord 26, whereby to raise the dog 5', and when said dog 5' is raised, the bearing 34 is swung toward the collar 2' under the influence of the spring 38, thus bringing the pinion 37 into position to hold the dog 5' in inoperative position. When the lever 21 is swung, the lug 22$^a$ thereof bears downwardly upon the outer arm of the lever 10, and swings the same downwardly, whereby the joints of the levers 9—10 are moved upwardly, thereby pulling the cord 20 and raising the dog 5. When the lever 10 is swung to an approximately horizontal position, it is engaged by the catch 28, and said levers 9—10 are therefore held in this position. The gear shift lever 17 can now be moved to "neutral", "low", "intermediate" and "high" positions to enable the automobile to move forwardly at the desired speeds, the levers 9—10 being held out of the way of the gear shift lever, and the dog 5 being held in raised position so as not to interfere with the turning movement of the shaft 1. As long as the collar 2' rotates forwardly, the dog 5' will be held away therefrom. The bearing 34 in swinging toward the collar 2' moves in the same direction as the adjacent portion of the collar 2', whereby the pinion 37 in being engaged and rotated by the collar 2' will tend to hold the bearing 34 against the lug 36, whereby to hold the dog 5' separated from the collar 2', but should the engine become stalled, as when going up a hill, or should any other accident occur, which would permit the automobile to run backward down the hill, the collar 2' in rotating backward, will push the bearing 34 toward inoperative position, against the light tension of the spring 38, but permitting the dog 5' to move into engagement with the collar 2', which will at once stop the machine before the automobile has an opportunity to move backwardly any appreciable extent. This device operates automatically, but the bearing 34 and pinion 37 can be moved to inoperative position positively by means of the cord 26ᵃ, which when pulled, will swing the arm 39 and bearing 34 away from the collar 2', thus permitting the dog 5' to engage the collar 2' and hold it stationary.

The automobile can also be stopped when descending a hill, or under other conditions, by releasing the catch 28 which holds the levers 9—10; this being readily done by pulling the stem 31. The spring 18 will therefore swing the remote arms of the levers 9—10 upwardly and toward one another, thus slackening the cord 20, and permitting gravity and the spring 8 to move the dog 5 into engagement with the collar 2, which will stop the rotation of the shaft 1. Therefore, when the machine is running, with the levers 9—10 held by the catch 28, an emergency braking action can be provided by simply pulling the cord 29 to release the catch 28.

Fig. 6 illustrates a different way of using the device illustrated in Fig. 5. Thus the cords 7' and 26ᵃ which are passed over the respective pulleys or guides 27' and 30ᵃ, can be attached to spring pressed stems 31' and 31ᵃ, respectively, which are provided with the respective eyes 32' and 32ᵃ. The eyes are engageable with the respective hooks 33' and 33ᵃ carried by the dash or other suitable part of the machine. When the stem 31' is raised, the cord 7' is pulled to raise the dog 5', and said dog can be held in released position by engaging the eye 32' with the hook 33'. The cord 7', in starting the machine, can be pulled to assure of the bearing 34 swinging to operative position. The dog 5' will be released automatically should the automobile move backwardly without warning. The bearing 34 can be moved to releasing position by pulling the cord 26ᵃ.

It is to be noted that with the use of the lever 21, when the gear shift lever 17 is moved to "reverse" position, the cord 26 and cord 7' are pulled, to hold the dog 5' in released position, notwithstanding the fact that the shaft 1 and collar 2' rotate backwardly, thus preventing the automatic releasing means of the dog 5' from stopping the machine, under these conditions.

Having thus described the invention, what is claimed as new is:

1. In a mechanism of the character described, a rotatable member, a dog mounted for movement into and out of engagement with said member, a second member hingedly connected with the dog to bear against the first mentioned member whereby the rotation of the first mentioned member in one direction moves the dog to inoperative position.

2. In a mechanism of the character described, a rotatable toothed collar, a toothed dog mounted for sliding movement into and out of engagement with said collar, a bearing hingedly connected with the dog to swing toward and away from the collar, and a pinion journaled to the bearing and adapted to engage the teeth of the collar, said bearing when swung toward the collar serving as a prop to hold the dog separated from the collar.

3. In a mechanism of the character described, a rotatable toothed collar, a toothed dog mounted for sliding movement into and out of engagement with said collar, a bearing hingedly connected with the dog to swing toward and away from the collar, a pinion journaled to the bearing and adapted to engage the teeth of the collar, said bearing when swung toward the collar serving as a prop to hold the dog separated from the collar, means tending to swing said bearing toward the collar, means for swinging the bearing away from the collar, and means for moving the dog away from the collar.

4. The combination with movable means of an automobile and a gear shift lever, of means for stopping said means, a device operated by said lever when moved from neutral to its other positions for holding the stopping means in inoperative position, and manually releasable means to hold the holding means when operated by said lever.

5. The combination with a movable member and a gear shift lever of an automobile, of a dog engageable with said member for stopping it, a pair of oppositely disposed U-shaped levers fulcrumed between their bends and terminals and having their terminals engaged with one another, said U-shaped levers surrounding the gear shift lever and being so arranged that the gear shift lever in being moved to different positions will engage the bends of said U-shaped levers to swing them, means operatively connecting said U-shaped levers and the dog to move the dog to inoperative position when said U-shaped levers are swung by the gear shift lever, and a releasable catch for holding said U-shaped levers when moved by the gear shift lever.

6. The combination with movable means and a gear shift lever of an automobile, of stopping means for said movable means, second stopping means normally permitting the movement of the movable means in one direction and preventing the opposite rotation thereof, and a mechanism coöperating with said lever and connected to said stopping means and operated by said lever when it is moved from neutral to its other positions for holding the first mentioned stopping means in inoperative position and also operated when said lever is moved to "reverse" position to hold the second stopping means in inoperative position.

7. The combination with movable means and a gear shift lever of an automobile, of stopping means for said movable means, a device operated by the gear shift lever and connected to said stopping means to hold it in inoperative position, releasable means for holding said device in position with the stopping means in inoperative position, second stopping means for stopping the movable means, means for holding the second stopping means in inoperative position when said movable means moves in one direction, and a second device operated by the gear shift lever when the same is moved to "reverse" position for moving the second stopping means to inoperative position, the first mentioned device being moved by the second mentioned device and being moved by the gear shift lever when it is moved to other positions.

8. The combination with a rotatable member and gear shift lever of an automobile, of a dog engageable with said member to stop it, a second dog for stopping said member, means for holding the second dog in inoperative position when said member rotates in one direction, a pair of levers connected with one another and arranged to be operated by the gear shift lever, said pair of levers being connected to the first mentioned dog to move it to inoperative position when said pair of levers is operated by the gear shift lever, a releasable catch for holding said pair of levers when moved by the gear shift lever, and another lever operatively connected with the second dog and arranged to be operated when the gear shift lever is moved to "reverse" position to move the second dog to inoperative position, said pair of levers being moved when the last mentioned lever is moved by the gear shift lever.

In testimony that I claim the foregoing as my own, I have hereto affixed my signature in the presence of two witnesses.

LEVI HORNOR.

Witnesses:
G. G. TUCKER,
S. O. NAFZGER.

Copies of this patent may be obtained for five cents each, by addressing the "Commissioner of Patents, Washington, D. C."